United States Patent
Jia (10) Patent No.: US 11,992,998 B2
(45) Date of Patent: May 28, 2024

(54) METHOD FOR FABRICATING SHELL-SHAPED DENTAL APPLIANCE

(71) Applicant: ARTECHX TECHNOLOGIES, LLC., Mckinney, TX (US)

(72) Inventor: Jun Jia, Mckinney, TX (US)

(73) Assignee: ARTECHX TECHNOLOGIES, LLC., McKinney, TX (US)

( * ) Notice: Subject to any disclaimer, the term of this patent is extended or adjusted under 35 U.S.C. 154(b) by 388 days.

(21) Appl. No.: 17/474,047

(22) Filed: Sep. 13, 2021

(65) Prior Publication Data
US 2023/0078215 A1    Mar. 16, 2023

(51) Int. Cl.
| | |
|---|---|
| *B29C 64/112* | (2017.01) |
| *A61C 7/08* | (2006.01) |
| *B29C 64/386* | (2017.01) |
| *B33Y 10/00* | (2015.01) |
| *B33Y 50/00* | (2015.01) |
| *B33Y 80/00* | (2015.01) |
| *B29L 31/00* | (2006.01) |

(52) U.S. Cl.
CPC ............. *B29C 64/112* (2017.08); *A61C 7/08* (2013.01); *B29C 64/386* (2017.08); *B33Y 10/00* (2014.12); *B33Y 50/00* (2014.12); *B33Y 80/00* (2014.12); *B29L 2031/753* (2013.01)

(58) Field of Classification Search
None
See application file for complete search history.

(56) References Cited

U.S. PATENT DOCUMENTS

| | | | |
|---|---|---|---|
| 2017/0360534 A1* | 12/2017 | Sun | B33Y 70/10 |
| 2018/0325635 A1* | 11/2018 | Mayr | A61C 7/14 |
| 2023/0200944 A1* | 6/2023 | Yu | B32B 27/308 433/6 |

* cited by examiner

*Primary Examiner* — Mohammad M Ameen
(74) *Attorney, Agent, or Firm* — Birch, Stewart, Kolasch & Birch, LLP (57) ABSTRACT

In one aspect, the present application provides a method for fabricating shell-shaped dental appliance, comprising: generating a first 3D digital model representing an assembly of a support and a shell-shaped dental appliance, where the support has a first surface that conforms to and clings to a second surface of the shell-shaped dental appliance; and using the first 3D digital model to control a device to discharge successive drops of at least one fluid phase and solidifiable appliance material and successive drops of at least one fluid phase and solidifiable support material to form the assembly slice by slice along a first direction.

17 Claims, 6 Drawing Sheets

METHOD FOR FABRICATING SHELL-SHAPED DENTAL APPLIANCE

FIELD OF THE APPLICATION

The present application generally relates to method for fabricating shell-shaped dental appliance.

BACKGROUND

Shell-shaped dental appliances such as tooth repositioners and retainers made of polymer materials become more and more popular due to their advantages on aesthetic appearance, ease of use and hygiene. A shell-shaped dental appliance is usually a one-piece shell which forms a tooth-receiving cavity having a geometry that substantially matches a corresponding tooth arrangement.

A common shell-shaped dental appliance fabricating method is pressure or vacuum forming a heated sheet of polymer material over a positive tooth model to obtain a corresponding negative model, and then trim off the excess part of the negative model to obtain a corresponding shell-shaped dental appliance. The inventors of the present application realized that the method has the following disadvantages: (1) since a large part of each negative model will be trimmed off, it results in a great waste of material; (2) if the geometry of a positive model is complicated, it is difficult to remove a negative model formed on the positive model; (3) the shape and geometry design of a negative model is highly restricted by thermoforming process, some advanced features such as bite ramp, twin block, hook etc. can not be directly formed by thermoforming process, or they can be formed but with unsatisfactory properties.

3D printing based approaches were also proposed, however, the inventors of the present application realized that these approaches are not practical due to the following issues: (1) preferred materials can not be used in conventional 3D printing systems; (2) mechanical properties of printed shell-shaped dental appliances are compromised because of their micro-structures and materials.

In view of the above, it is necessary to provide a new method for fabricating shell-shaped dental appliance.

SUMMARY

In one aspect, the present application provides a method for fabricating shell-shaped dental appliance, comprising: generating a first 3D digital model representing an assembly of a support and a shell-shaped dental appliance, where the support has a first surface that conforms to and clings to a second surface of the shell-shaped dental appliance; and using the first 3D digital model to control a device to discharge successive drops of at least one fluid phase and solidifiable appliance material and successive drops of at least one fluid phase and solidifiable support material to form the assembly slice by slice along a first direction.

In some embodiments, the first 3D digital model is generated based on a 3D digital model representing a corresponding tooth arrangement.

In some embodiments, the method may further comprise: removing the support from the assembly to obtain the shell-shaped dental appliance.

In some embodiments, wherein the at least one support material may be soluble in a solvent, and the support is removed by washing the assembly in the solvent.

In some embodiments, the first surface is a continuous surface.

In some embodiments, the second surface may be an inner surface of the shell-shaped dental appliance.

In some embodiments, the assembly may be formed on a substrate, the bottom of the assembly is attached to the substrate, the first direction is from the bottom to the top of the assembly.

In some embodiments, an undercut of the shell-shaped dental appliance may be covered by the support in the first 3D digital model.

In some embodiments, the shell-shaped dental appliance may be fully covered by the support in the first 3D digital model.

In some embodiments, each of the at least one fluid phase appliance material is introduced into a buffer chamber in which a pressure is generated on the fluid phase appliance material, and the drops of the appliance material are discharged by an outlet opening in fluid connection with the buffer chamber by opening and closing the outlet opening repeatedly.

In some embodiments, each fluid phase appliance material is formed by melting the appliance material in solid state by heating.

In some embodiments, the shell-shaped dental appliance includes multiple layers of drops of the at least one appliance material along thickness direction.

In some embodiments, the shell-shaped dental appliance includes two layers along thickness direction, one of the two layers is constructed of drops of a first appliance material, and the other of the two layers is constructed of drops of a second appliance material, which is different from the first appliance material.

In some embodiments, the shell-shaped dental appliance includes one layer along thickness direction, the layer includes two parts each of which is constructed of drops of a different appliance material.

In some embodiments, the drops of the at least one appliance material are discharged along dental arch.

In some embodiments, diameter of the drops of the at least one fluid phase appliance material is within the range from 0.05~0.15 mm.

BRIEF DESCRIPTION OF THE DRAWINGS

The above and other features of the present application will be further illustrated below with reference to figures and their detailed description. It should be appreciated that these figures only show several exemplary embodiments according to the present application, they should not be construed as limiting the protection scope of the present application. Unless otherwise specified, the figures are not necessarily drawn to scale, and similar reference numbers therein denote similar components.

DETAILED DESCRIPTION OF ILLUSTRATED EMBODIMENTS

In the following detailed description, reference is made to the accompany drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

Figure 1:
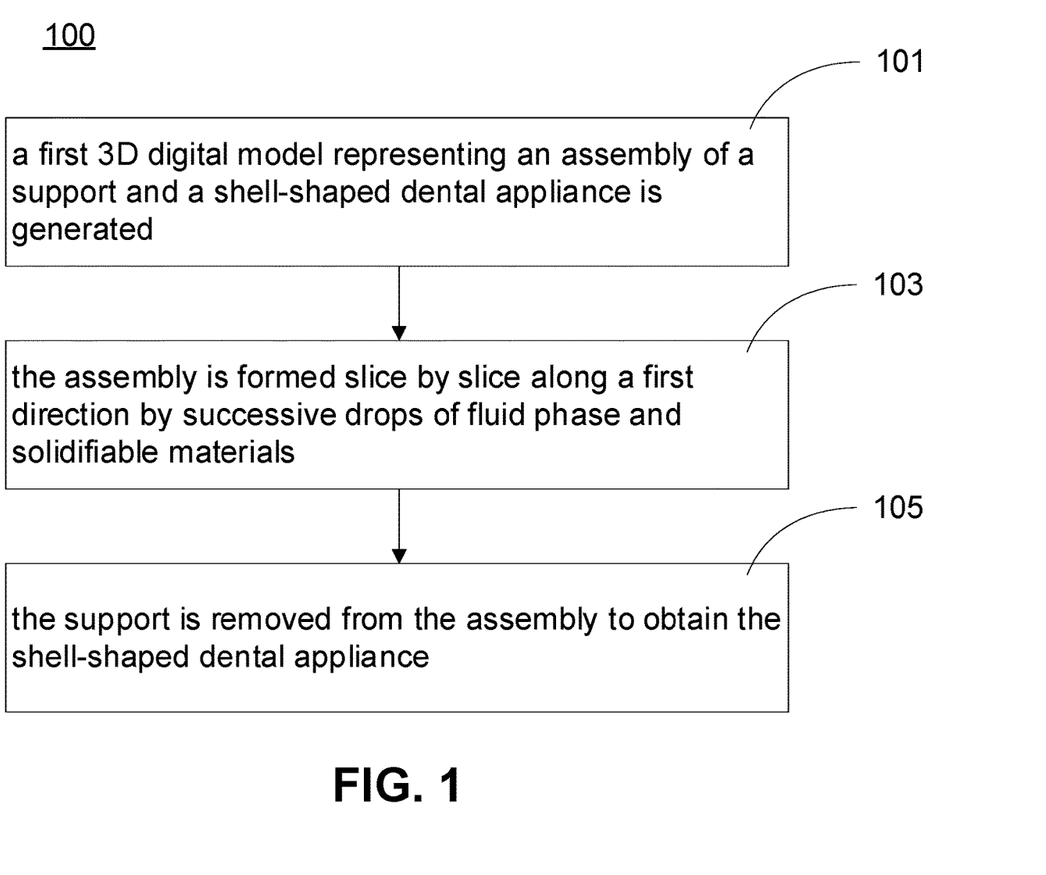
FIG. 1 illustrates a schematic flow-chart of a method for fabricating shell-shaped dental appliance according to one embodiment of the present application.

FIG. 1 is a schematic flow-chart of a method 100 for fabricating shell-shaped dental appliance according to one embodiment of the present application. It is understood that a shell-shaped dental appliance could be a repositioner for repositioning teeth from a first tooth arrangement to a second tooth arrangement, or a retainer for keeping teeth in a tooth arrangement, or an appliance having any other purpose.

In 101, a first 3D digital model representing an assembly of a support and a shell-shaped dental appliance is generated.

In the method 100, a shell-shaped dental appliance is basically fabricated by discharging successive drops of at least one fluid phase and solidifiable appliance material, to form the shell-shaped dental appliance slice by slice along a first direction (for example, upwards), where an appliance material is a material used to fabricate shell-shaped dental appliances. Since a shell-shaped dental appliance has a thin-walled 3D structure, to form such a structure with drops of fluid phase material(s), a support that conforms to and clings to the shell-shaped dental appliance is needed, and the support and the shell-shaped dental appliance are formed slice by slice along the first direction simultaneously.

To form a smooth inner surface or a smooth outer surface of the shell-shaped dental appliance, it is preferred that a corresponding surface of the support is a continuous smooth surface instead of a screen-structured surface.

Figure 2A:
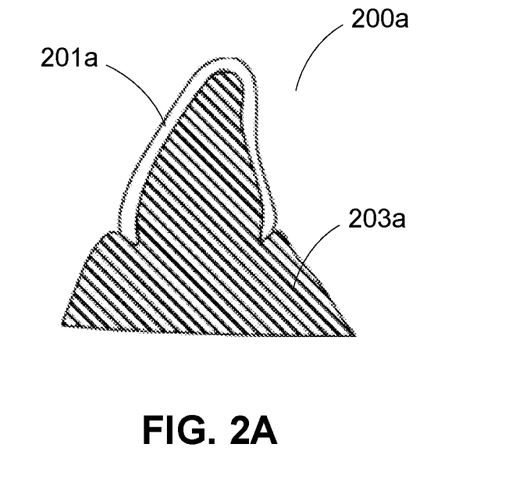
FIG. 2A schematically illustrates a 3D digital model of an assembly of a support and a shell-shaped dental appliance according to one embodiment of the present application.

FIG. 2A schematically shows a cross-section of a 3D digital model of an assembly 200a of a shell-shaped dental appliance 201a and a support 203a according to one embodiment.

In one embodiment, the support 203a may be solid. In another embodiment, the support 203a may be hollow, to save material. In a further embodiment, the support 203a may have a sponge-like inner-structure.

In one embodiment, the 3D digital model of the support 203a may be generated based on a 3D digital model of a corresponding tooth arrangement. In one embodiment, if the support 203a is solid and no addition feature is needed, the 3D digital model of the corresponding tooth arrangement may be taken as the 3D digital model of the support 203a directly.

In another embodiment, the 3D digital model of the corresponding tooth arrangement may be modified to obtain the 3D digital model of the support 203a, such modifications include but not limited to changing its inner structure and adding a feature on one tooth.

Then the 3D digital model of the shell shaped dental appliance 201a may be "grown" on a selected surface of the 3D digital model of the support 203a, to form the 3D digital model of the assembly 200a.

Figure 2B:
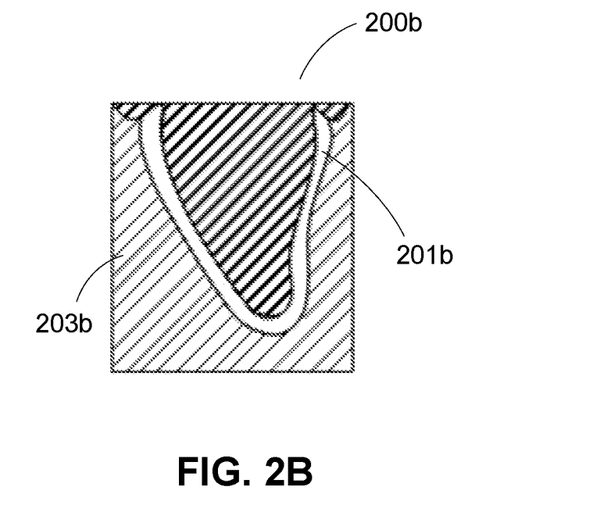
FIG. 2B schematically illustrates a 3D digital model of an assembly of a support and a shell-shaped dental appliance according to another embodiment of the present application.

FIG. 2B schematically shows a cross-section of a 3D digital model of an assembly 200b of a shell-shaped dental appliance 201b and a support 203b according to another embodiment. In this embodiment, the 3D digital model of the shell-shaped dental appliance 201b is upside down compared with the above embodiment.

In one embodiment, the 3D digital model of the shell-shaped dental appliance 201b may be generated based on a 3D digital model of a corresponding tooth arrangement first. Then the 3D digital model of the shell-shaped dental appliance 201b may be "buried in" a cube or any other suitable shape 3D body to form the 3D digital model of the assembly 200b, where except the shell-shaped dental appliance 201b, the rest part of the 3D digital model of the assembly 200b constitutes the support 203b.

Figure 2C:
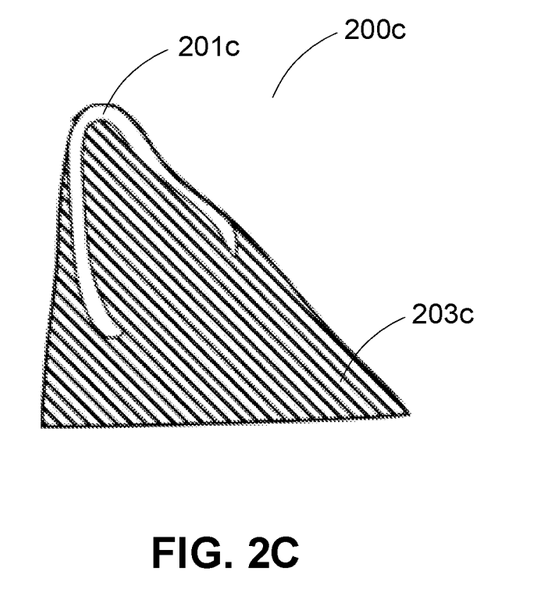
FIG. 2C schematically illustrates a 3D digital model of an assembly of a support and a shell-shaped dental appliance according to another embodiment of the present application.

FIG. 2C schematically shows a cross-section of a 3D digital model of an assembly 200c of a shell-shaped dental appliance 201c and a support 203c according to another embodiment. Compared with the 3D digital model of the assembly 200a, a part of the outer surface of the shell-shaped dental appliance 201c is covered by the support 203c, to eliminate any undercut on the 3D digital model of the assembly 200c, or at least cover the undercut part of the shell-shaped dental appliance 201c. Since in this method, a support and a shell-shaped dental appliance are formed by discharged drops of fluid phase and solidifiable materials, an assembly with no undercut has advantage on forming the shell-shaped dental appliance having a desired geometry.

Figure 2D:
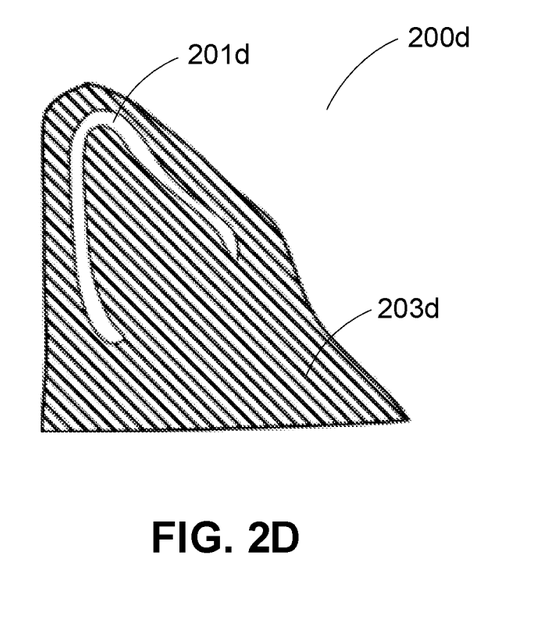
FIG. 2D schematically illustrates a 3D digital model of an assembly of a support and a shell-shaped dental appliance according to another embodiment of the present application.

FIG. 2D schematically shows a cross-section of a 3D digital model of an assembly 200d of a shell-shaped dental appliance 201d and a support 203d according to another embodiment. Compared with the 3D digital model of the assembly 200a, the shell-shaped dental appliance 201d is fully covered by the support 203d.

It is understood that any feature may be formed on the 3D digital model of the shell-shaped dental appliance if needed, such features include but not limited to bite ramp, bite stop, twin block, hook, button, cavity for receiving an attachment fixed on tooth surface, and reinforcement rib etc.

In 103, the assembly is formed slice by slice along a first direction by successive drops of fluid phase and solidifiable materials.

Figure 3:
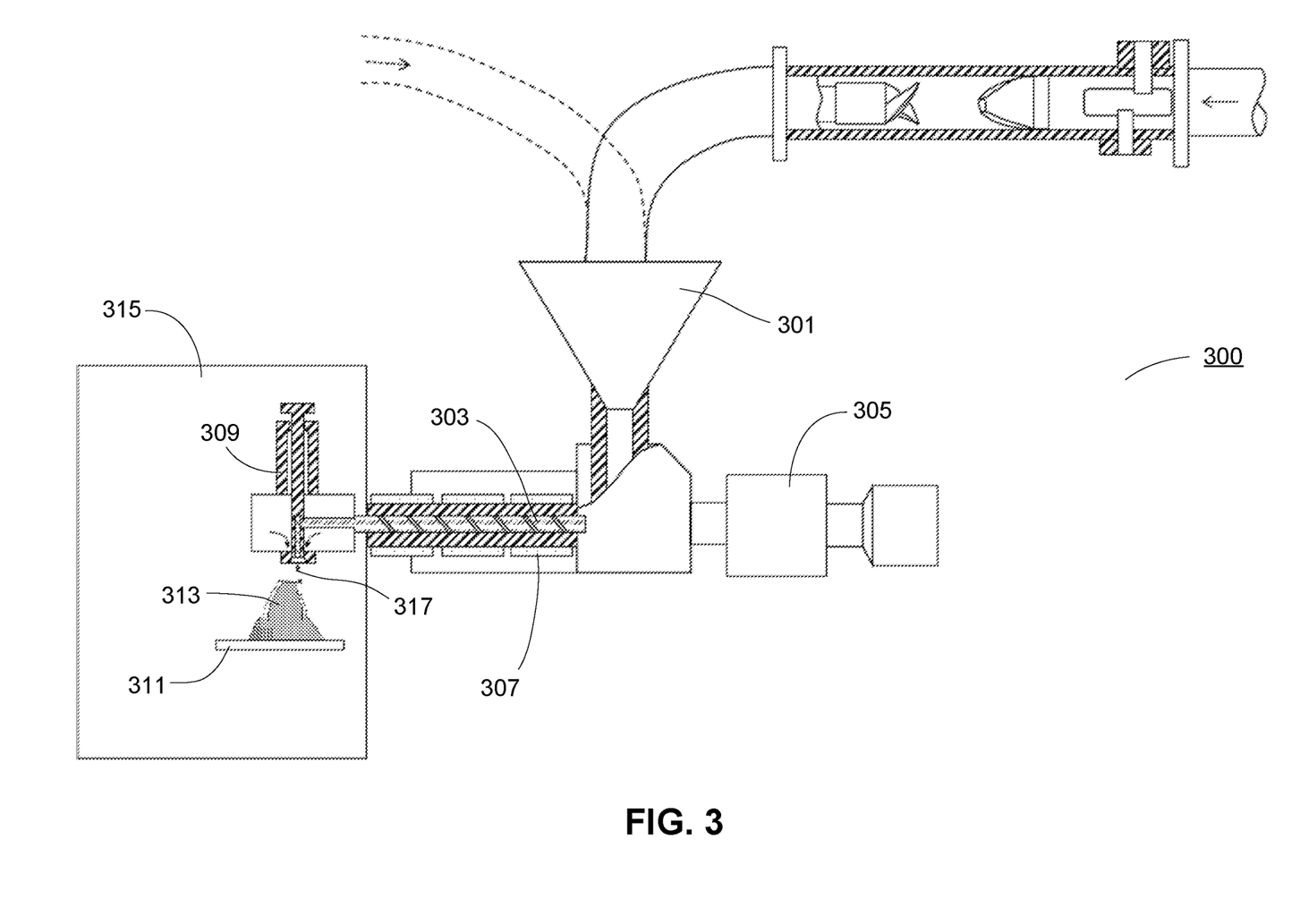
FIG. 3 schematically illustrates a device for fabricating shell-shaped dental appliance according to one embodiment of the present application.

Before describe in detail how the shell-shaped dental appliance is fabricated, a device 300 for fabricating shell-shaped dental appliance will be introduced according to FIG. 3.

Solid state granules of an appliance material are stored in a container 301 which is connected with a conveying screw 303, so that the solid state granules in the container 301 can be conveyed by the conveying screw 303.

In some embodiments, the appliance material may be one of the following: Thermoplastic Polyurethane (TPU), Polyethylene Terephthalate Glycol (PETG), Poly Cyclohexylenedimethylene Terephthalate Glycol (PCTG), Thermoplastic Elastomers (TPE), Polycarbonates (PC), polyamide (PA) and their derivatives.

The conveying screw 303 is driven by a motor 305. Multiple heating elements 307 are arranged along the conveying screw 303, to heat and melt the granules of the appliance material, to generate a flow of the appliance material in fluid phase. Then the fluid phase appliance material is introduced into a discharging device 309.

Figure 4:
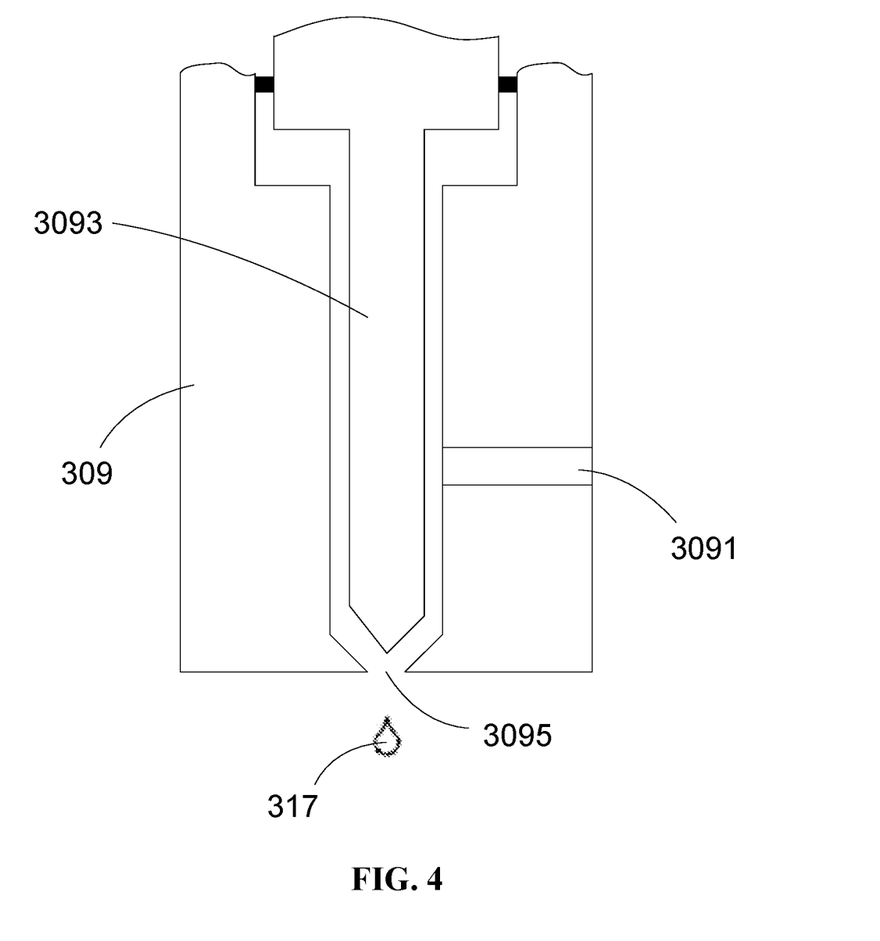
FIG. 4 schematically illustrates a discharging device of the device for fabricating shell-shaped dental appliance shown in FIG. 3.

Please refer to FIG. 4, which schematically illustrates the discharging device 309 according to one embodiment. The fluid phase appliance material is introduced into a buffer chamber 3091 and is pressurized by the conveying screw 303 driven by the motor 305. By moving up and down, a pin 3093 opens and closes an outlet opening 3095 which is fluid connection with the buffer chamber 3091, to sequentially discharge the fluid phase material in the form of drops 317.

In one embodiment, it is preferred that the diameter of the drop 317 is in the range from 0.01 to 0.3 mm, more preferably in the range from 0.05 to 0.15 mm. To achieve this, it is preferred that the diameter of the outlet opening 3095 is slightly larger than that of the drops 317.

To keep the volume flow constant, the pressure within the buffer chamber 3091 is tracked and controlled as well as other parameters of the process such as temperature in the buffer chamber 3091.

Individual drops 317 are discharged sequentially from the outlet opening 3095, such that the shell-shaped dental appliance arises slice by slice (or layer by layer) in the construction chamber 315 on a substrate 311, which is movable along a plane relative to the outlet opening 3095 by a driver (not shown).

Similar with shell-shaped dental appliance, the support is also formed slice by slice by successive drops of a fluid phase and solidifiable support material, and the device 300 further includes a corresponding discharging device (not shown) for discharging the drops of the support material.

In a preferred embodiment, the shell-shaped dental appliance and the support are formed simultaneously, for example, a slice of the assembly, which slice includes an appliance part and a support part, is completely formed before it begins to form the next slice of the assembly.

In a preferred embodiment, the assembly 313 is formed slice by slice from bottom to top, where the bottom side of the assembly is attached to the substrate 311, and the top side is away from the substrate 311.

In one embodiment, the temperature in the construction chamber 315 is controlled and kept at a predetermined level which is proper for the forming of the shell-shaped dental appliance. For example, the temperature inside the construction chamber 315 may be kept at a level which is slightly lower than the melting temperature of the appliance material, to reduce stress in and deformation of the formed shell-shaped dental appliance.

In one embodiment, the temperature of the substrate 311 may be controlled independently and kept at a level which is proper for the forming of the shell-shaped dental appliance.

In one embodiment, the 3D digital model of the assembly may be used to control the device 300 to fabricate the assembly.

In 105, the support is removed from the assembly to obtain the shell-shaped dental appliance.

In one embodiment, the support may be breakable or deflectable, it includes a first section, a second section, and a weakened region that joins the first section to the second section. The weakened region is breakable or deflectable to enable the first section to be removed independently of the second section without damaging the shell-shaped dental appliance, this makes it easier to remove the support to obtain the shell-shaped dental appliance.

In another embodiment, a support material, which is soluble in a solvent that does not dissolve the material of the shell-shaped dental appliance, may be used to fabricate the support, so that the support can be washed off in the solvent to obtain the shell-shaped dental appliance. Examples of such materials include but not limited to support materials ARMAT 11 and ARMAT 12 from ARBURG, Inc. which are soluble in water, and support material ARMAT 21 from ARBURG, Inc. which is soluble in sodium hydroxide.

In one embodiment, the device 300 may include two discharging devices each of which is for discharging a different appliance material, a first discharging device may be used to discharge drops of a first shell-shaped dental appliance material, and a second discharging device may be used to discharge drops of a second shell-shaped dental appliance material, so that a shell-shaped dental appliance having layers of different materials along thickness direction can be fabricated. Such configuration may bring certain advantages in some circumstances. In one example, the most inner layer (the layer that is in contact with teeth) of the shell-shaped dental appliance is of a softer material for added comfort, and other layers may be of a material/materials having better mechanical properties to ensure performance on orthodontic treatment.

In one embodiment, a discharging device may include two or more conveying screws connected to a same outlet opening, each of the conveying screws is used to convey a different appliance material, so that each drop discharged by the discharge device is constituted by layers of different materials.

In one embodiment, the shell-shaped dental appliance may have different thickness at different parts. For example, if multiple neighboring teeth are used as anchor teeth in an orthodontic treatment, a part of the shell-shaped dental appliance (as repositioner) that covers these teeth may have a thickness greater than the other parts, to increase rigidity of this part.

In one embodiment, different parts of the shell-shaped dental appliance may be formed with different materials.

Figure 5:
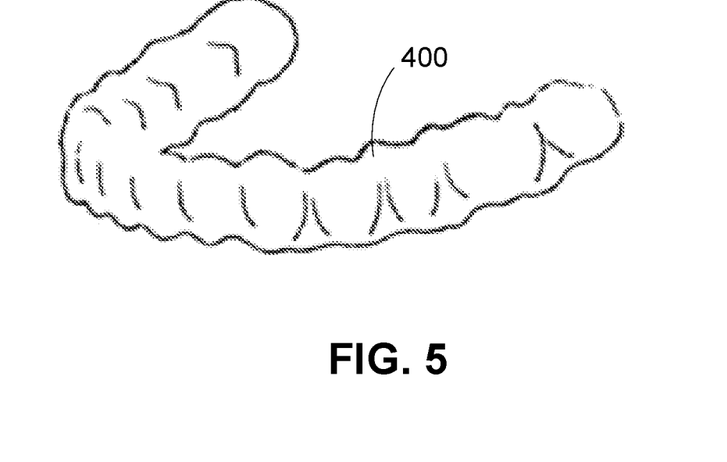
FIG. 5 schematically illustrates a shell-shaped dental appliance.

FIG. 5 schematically illustrates the shell-shaped dental appliance 400 fabricated using the method 100.

The inventors of the present application discovered upon extensive tests that mechanical properties of the shell-shaped dental appliance vary with direction along which the drops of the shell-shaped dental appliance material are discharged. Mechanical strength along the direction, along which the drops of the shell-shaped dental appliance material are discharged, is greatest. Since a major part of forces that applied on a repositioner in orthodontic treatment are forces along mesial-distal direction. Therefore, it is preferred that the drops of the shell-shaped dental appliance material are discharged along dental arch.

Figure 6A:
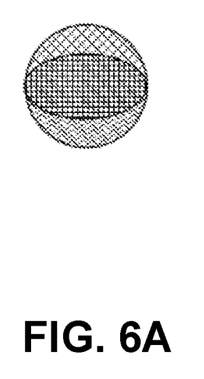
FIG. 6A schematically illustrates a cross-section of a drop constructed of layers of different appliance materials according to one embodiment of the present application.
Figure 6B:
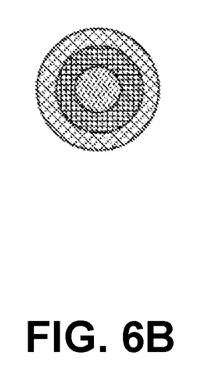
FIG. 6B schematically illustrates a cross-section of a drop constructed of layers of different appliance materials according to another embodiment of the present application.
Figure 6C:
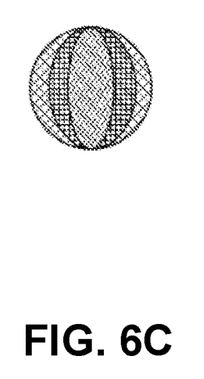
FIG. 6C schematically illustrates a cross-section of a drop constructed of layers of different appliance materials according to another embodiment of the present application.

In one embodiment, a discharging device may include two or more conveying screws connected to a same outlet opening, each of the conveying screws is used to convey a different shell-shaped dental appliance material, so that each drop discharged by the discharge device is constituted by layers of different materials. FIGS. 6A-6C schematically illustrate three different forms of drops having layers of different materials, respectively.

Inspired by the present application, besides the device 300 disclosed herein, any other device that is able to discharge successive drops of shell-shaped dental appliance materials can be used to fabricate shell-shaped dental appliance according to the method of the present application.

Shell-shaped dental appliances fabricated using the method of the present application have properties similar to those of shell-shaped dental appliances fabricated by thermoforming, in other words, their mechanical properties are good enough to accomplish orthodontic treatments. In addition, since no trimming off is needed, the method of the present application has significant advantage on material saving.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Additionally, with regard to flow diagrams, operational descriptions and method claims, the order in which the blocks are presented herein shall not mandate that various embodiments be implemented to perform the recited functionality in the same order unless the context dictates otherwise.

Unless the context dictates, terms used herein are generally intended as "open" terms instead of limiting. The use of phrases such as "one or more", "at least" and "but not limited to" should not be construed to imply that the parts of the present application that do not use similar phrases intend to be limiting.

I claim:

1. A method for fabricating shell-shaped dental appliance, comprising:
   generating a first 3D digital model representing an assembly of a support and a shell-shaped dental appliance, where the support has a first surface that conforms to and clings to a second surface of the shell-shaped dental appliance;
   using the first 3D digital model to control a device to discharge successive drops of at least one fluid phase and solidifiable appliance material for forming the shell-shaped dental appliance, and successive drops of at least one fluid phase and solidifiable support material for forming the support; and
   forming the assembly including both the shell-shaped dental appliance and the support together slice by slice along a first direction,
   wherein the shell-shaped dental appliance is a tooth repositioner for repositioning teeth of a patient from a first tooth arrangement to a second tooth arrangement which is different from the first tooth arrangement, and
   wherein the tooth repositioner is a one piece shell which forms a cavity for receiving the teeth, and the first 3D digital model is generated based on a 3D digital model represent the second tooth arrangement.

2. The method of claim 1, further comprising: removing the support from the assembly to obtain the shell-shaped dental appliance.

3. The method of claim 2, wherein the at least one support material is soluble in a solvent, and the support is removed by washing the assembly in the solvent.

4. The method of claim 1, wherein the first surface is a continuous surface.

5. The method of claim 4, wherein the second surface is an inner surface of the shell-shaped dental appliance.

6. The method of claim 1, wherein the assembly is formed on a substrate, the bottom of the assembly is attached to the substrate, the first direction is from the bottom to the top of the assembly.

7. The method of claim 1, wherein an undercut of the shell-shaped dental appliance is covered by the support in the first 3D digital model.

8. The method of claim 7, wherein the shell-shaped dental appliance is fully covered by the support in the first 3D digital model.

9. The method of claim 1, wherein each of the at least one fluid phase appliance material is introduced into a buffer chamber in which a pressure is generated on the fluid phase appliance material, and the drops of the appliance material are discharged by an outlet opening in fluid connection with the buffer chamber by opening and closing the outlet opening repeatedly.

10. The method of claim 1, wherein each fluid phase appliance material is formed by melting the appliance material in solid state by heating.

11. The method of claim 1, wherein the shell-shaped dental appliance includes multiple layers of drops of the at least one appliance material along thickness direction.

12. The method of claim 1, wherein the shell-shaped dental appliance includes two layers along thickness direction, one of the two layers is constructed of drops of a first appliance material, and the other of the two layers is constructed of drops of a second appliance material, which is different from the first appliance material.

13. The method of claim 1, wherein the shell-shaped dental appliance includes one layer along thickness direction, the layer includes two parts each of which is constructed of drops of a different appliance material.

14. The method of claim 1, wherein the drops of the at least one appliance material are discharged along dental arch.

15. The method of claim 1, wherein diameter of the drops of the at least one fluid phase appliance material is within the range from 0.05~0.15 mm.

16. The method of claim 1, wherein the shell-shaped dental appliance and the support are formed slice by slice along the first direction simultaneously.

17. The method of claim 16, wherein the step of forming the assembly including both the shell-shaped dental appliance and the support together slice by slice along the first direction comprises:
   forming a first slice by discharging successive drops of the at least one fluid phase and solidifiable appliance material for forming the shell-shaped dental appliance, and successive drops of the at least one fluid phase and solidifiable support material for forming the support, such that the first slice includes a part of the shell-shaped dental appliance and a part of the support; and
   forming a second slice along the first direction after forming the first slice.

* * * * *